(12) United States Patent
Arnault et al.

(10) Patent No.: US 11,306,810 B2
(45) Date of Patent: Apr. 19, 2022

(54) PULLEY DEVICE FOR A TENSIONER ROLLER OR WINDING ROLLER

(71) Applicant: Aktiebolaget SKF, Gothenburg (SE)

(72) Inventors: Benoit Arnault, Saint-Cyr-sur-Loire (FR); Benoît Hauvespre, Saint Etienne de Chigny (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 290 days.

(21) Appl. No.: 16/363,420

(22) Filed: Mar. 25, 2019

(65) Prior Publication Data
US 2019/0301589 A1 Oct. 3, 2019

(30) Foreign Application Priority Data
Apr. 3, 2018 (FR) ...................... 1852855

(51) Int. Cl.
| | |
|---|---|
| *F16H 57/00* | (2012.01) |
| *F16C 19/06* | (2006.01) |
| *F16H 7/12* | (2006.01) |
| *F16H 55/36* | (2006.01) |
| *F16H 7/20* | (2006.01) |
| *F16C 19/18* | (2006.01) |
| *F16H 7/08* | (2006.01) |

(52) U.S. Cl.
CPC ......... *F16H 57/0031* (2013.01); *F16C 19/06* (2013.01); *F16C 19/18* (2013.01); *F16H 7/08* (2013.01); *F16H 7/12* (2013.01); *F16H 7/20* (2013.01); *F16H 55/36* (2013.01); *F16C 2361/63* (2013.01); *F16H 2007/0865* (2013.01)

(58) Field of Classification Search
CPC .............. F16C 2361/63; F16C 13/006; F16H 2007/0865; F16H 55/36; F16H 7/20
USPC ........................................... 474/199
See application file for complete search history.

(56) References Cited

U.S. PATENT DOCUMENTS

| | | | | |
|---|---|---|---|---|
| 3,722,968 A | * | 3/1973 | Bomberger ........... | F16C 13/006 384/492 |
| 4,025,132 A | * | 5/1977 | Watanabe ............. | F16C 13/006 384/130 |
| 4,113,328 A | * | 9/1978 | Meulen ................. | B65G 39/09 384/482 |
| 4,474,562 A | * | 10/1984 | Heurich ................ | F16H 7/1281 29/517 |

(Continued)

FOREIGN PATENT DOCUMENTS

| | | |
|---|---|---|
| CN | 203335757 U | 12/2013 |
| DE | 102007049906 A1 | 4/2009 |

(Continued)

*Primary Examiner* — Henry Y Liu
(74) *Attorney, Agent, or Firm* — Garcia-Zamor Intellectual Property Law; Ruy Garcia-Zamor; Bryan Peckjian (57) ABSTRACT

A pulley device for a tensioner roller or winding roller of a transmission element, having a fixed inner element, a rotating outer element that is mounted to rotate coaxially about the fixed inner element, and an annular protective flange having a substantially radial portion bearing against a front surface of the fixed inner element. The flange includes an annular folded portion extending substantially axially from an outer edge of the flange and passing radially into the immediate vicinity of an axially protruding annular portion of the rotating outer element to form a narrow passage.

16 Claims, 8 Drawing Sheets

(56) References Cited

U.S. PATENT DOCUMENTS

| | | | | |
|---|---|---|---|---|
| 4,504,252 A * | 3/1985 | Honma | F16C 13/006 | 474/112 |
| 4,511,192 A * | 4/1985 | Hans | F16C 13/006 | 384/543 |
| 4,602,875 A * | 7/1986 | Doerr | F16H 55/48 | 384/547 |
| 4,610,646 A * | 9/1986 | Walter | F16C 13/006 | 474/174 |
| 4,792,243 A * | 12/1988 | Takeuchi | F16C 33/6618 | 384/486 |
| 4,810,108 A * | 3/1989 | Yajima | F16C 13/006 | 384/488 |
| 4,863,293 A * | 9/1989 | Sytsma | F16C 13/006 | 384/482 |
| 5,630,769 A * | 5/1997 | Schmidt | B60B 5/02 | 474/167 |
| 5,725,448 A * | 3/1998 | Kato | F16C 13/006 | 384/510 |
| 5,775,819 A * | 7/1998 | Kinney | F16C 13/006 | 384/449 |
| 6,220,982 B1 * | 4/2001 | Kawashima | F16H 55/44 | 474/199 |
| 6,241,257 B1 * | 6/2001 | Hauck | F16C 13/006 | 277/637 |
| 6,357,926 B1 * | 3/2002 | Hauck | F16C 13/006 | 384/546 |
| 6,854,893 B2 * | 2/2005 | Schmidt | F16C 13/006 | 384/477 |
| 7,011,593 B2 * | 3/2006 | Schenk | F16C 33/723 | 474/199 |
| 7,591,593 B2 * | 9/2009 | Tsujimoto | F16C 33/7896 | 384/486 |
| 7,695,385 B2 * | 4/2010 | Barraud | F16C 35/07 | 474/199 |
| 8,012,053 B2 * | 9/2011 | Filip | F16C 13/006 | 474/144 |
| 8,172,056 B2 * | 5/2012 | Barraud | F16D 41/069 | 192/45.1 |
| 8,235,851 B2 * | 8/2012 | Eidloth | F16C 33/6607 | 474/199 |
| 9,086,139 B2 * | 7/2015 | Varnoux | F16C 35/063 | |
| 9,416,863 B2 * | 8/2016 | Schaefer | F16H 55/48 | |
| 9,452,580 B2 * | 9/2016 | Swane | F16H 55/48 | |
| 9,464,700 B2 * | 10/2016 | Hedman | F16C 33/586 | |
| 9,506,538 B2 * | 11/2016 | Hedman | F16H 7/20 | |
| 2004/0097313 A1 * | 5/2004 | Singer | F16C 41/04 | 474/199 |
| 2004/0235599 A1 * | 11/2004 | Ozorak | F16C 25/08 | 474/199 |
| 2005/0026729 A1 * | 2/2005 | Schenk | F16C 33/7896 | 474/101 |
| 2006/0153484 A1 * | 7/2006 | Ohata | F16C 33/7823 | 384/484 |
| 2006/0171622 A1 * | 8/2006 | Ohata | F04B 27/1063 | 384/513 |
| 2007/0072714 A1 * | 3/2007 | Filip | F16C 33/723 | 474/144 |
| 2007/0242909 A1 * | 10/2007 | Fournier | F16C 29/045 | 384/132 |
| 2008/0132365 A1 * | 6/2008 | Boussaguet | F16H 7/20 | 474/136 |
| 2008/0230341 A1 * | 9/2008 | Barraud | F16D 41/069 | 192/41 A |
| 2009/0098967 A1 * | 4/2009 | Eidloth | F16C 19/26 | 474/199 |
| 2009/0226124 A1 * | 9/2009 | Nakagawa | F16C 33/7859 | 384/478 |
| 2009/0298630 A1 * | 12/2009 | Mineno | F16C 35/063 | 474/199 |
| 2011/0009220 A1 * | 1/2011 | Arnault | F16C 35/073 | 474/166 |
| 2012/0028745 A1 * | 2/2012 | Mola | F16C 13/006 | 474/166 |
| 2012/0142468 A1 * | 6/2012 | Lescorail | F16C 43/04 | 474/136 |
| 2012/0142470 A1 * | 6/2012 | Varnnoux | F16C 19/163 | 474/199 |
| 2013/0225344 A1 * | 8/2013 | Arnault | F16H 55/36 | 474/166 |
| 2013/0337952 A1 * | 12/2013 | Berruet | F16F 15/1245 | 474/94 |
| 2013/0337953 A1 * | 12/2013 | Berruet | F16D 3/68 | 474/94 |
| 2014/0364258 A1 * | 12/2014 | Lescorail | F01P 5/12 | 474/150 |
| 2015/0141185 A1 * | 5/2015 | Albrecht | F16H 55/36 | 474/199 |
| 2015/0267791 A1 * | 9/2015 | Hedman | F16C 13/006 | 474/199 |
| 2015/0292603 A1 * | 10/2015 | Cherioux | F16H 7/20 | 474/166 |
| 2015/0300463 A1 * | 10/2015 | Albrecht | F16H 7/20 | 474/166 |
| 2016/0327146 A1 * | 11/2016 | Lescorail | F16H 55/36 | |

FOREIGN PATENT DOCUMENTS

| | | |
|---|---|---|
| FR | 3078759 A1 | 9/2019 |
| JP | 2005337383 A | 12/2005 |
| WO | 2015005416 A1 | 1/2015 |

* cited by examiner

PULLEY DEVICE FOR A TENSIONER ROLLER OR WINDING ROLLER

CROSS-REFERENCE

This application claims priority to French patent application no. 1852855 filed on Apr. 3, 2018, the contents of which is fully incorporated herein by reference.

TECHNOLOGICAL FIELD

The present invention relates to the field of pulley devices for tensioner rollers or winding rollers that are intended to cooperate with a transmission element, for example a timing belt or chain or a drive belt or chain of a motor vehicle internal combustion engine.

BACKGROUND

Such rollers serve generally to permanently maintain tension in the transmission element in a given range or to locally modify the path taken thereby. The rollers are thus referred to as tensioner rollers and winding rollers, respectively. In winding rollers, the pulley is rotatably mounted on a threaded screw body via a bearing, the roller then being fixed directly or indirectly to the engine block or to an element of a tensioner roller device, for example an articulated arm or an eccentric.

The bearing generally comprises a fixed inner ring having a bore through which the screw passes, a rotating outer ring surmounted by the pulley, and at least one row of rolling elements interposed between the rings.

Such devices are often equipped with additional protective flanges that help to protect the device from contaminants or spatter originating from the outside environment. The flange also serves as a thrust washer for the head of the screw.

However, particles or other polluting elements can get between the flange and the bearing of the pulley device. The bearing is generally provided with additional sealing means inherent thereto, for example seals which close the bearing chamber in which the rolling elements are housed, and which are able to stop this pollution.

However, this pollution can build up over time in the immediate vicinity of the sealing means of the bearing. Since the sealing means can become worn, the risk of the pollution getting into the bearing chamber increases with the duration of use of the pulley device. This internal pollution can have the consequence of accelerated deterioration of the internal components of the bearing, in particular the contact surfaces between the rolling elements and the rings. This can result in a drop in the quality of the rotating mechanical connection provided by the pulley device, and a reduced service life of the internal components thereof. The risk of breakage, notably in operating mode, is also higher.

It is therefore desirable to limit the ingress of pollution to a maximum by improving the shape of the flange.

SUMMARY

The present invention aims to remedy this drawback.

More particularly, the present invention aims to provide a pulley device that is resistant to high levels of pollution, is particularly economical, is easy and safe to mount, forming a subassembly that is incapable of being dismantled, and has a smaller axial and radial space requirement.

The invention relates to a pulley device for a tensioner roller or winding roller for a transmission element, comprising a fixed inner element, a rotating outer element, and a protective flange.

The fixed inner element comprises a mounting bore for the device that is intended to take a screw.

The rotating outer element is mounted so as to rotate coaxially about the fixed inner element and comprises an outer surface intended to cooperate with the transmission element.

The protective flange is annular and comprises a substantially radial portion bearing against a front surface of the fixed inner element, the substantially radial portion having an inner edge forming a bore of the flange.

According to the invention, the flange comprises an annular folded portion extending substantially axially from an outer edge of the flange and passing radially into the immediate vicinity of an axially protruding annular portion of the rotating outer element so as to form a narrow passage.

A folded portion is understood here to mean an overall shape having a flange part which is formed by at least one fold of the outer edge of the substantially radial portion of the flange and which extends in a substantially axial direction.

According to further advantageous but non-essential features of the invention, taken on their own or in combination:

The pulley device comprises a bearing having a rotating outer ring that is part of the fixed inner element, a fixed inner ring that is part of the rotating outer element, the rings being coaxial and forming a radial space between one another, sealing means that close the radial space on each axial side, and at least one row of rolling elements arranged in the radial space.

The inner ring of the bearing comprises a bore forming the mounting bore of the device that is intended to take a screw, the fixed inner element consisting of the fixed inner ring of the bearing.

The bearing comprises an annular spacer mounted in a bore of the inner ring of the bearing, the spacer being provided with a bore forming the mounting bore of the device that is intended to take a screw, the fixed inner element consisting of the fixed inner ring and the spacer of the bearing.

The device comprises a pulley mounted on the rotating outer ring of the bearing, the pulley being provided with an outer surface intended to cooperate directly with a transmission element, the rotating outer element consisting of the pulley and the outer ring of the bearing.

The rotating outer ring of the bearing comprises an outer surface intended to cooperate directly with a transmission element, the rotating outer element consisting of the outer ring of the bearing.

The rolling elements are balls.

A cage maintains the circumferential spacing of the rolling elements.

The protective flange comprises a first radial portion of small diameter provided with an inner edge forming a bore of the flange and an outer edge, the first radial portion bearing against a front surface of the fixed inner element, a second radial portion of large diameter provided with an inner edge and an outer edge, and a substantially axial intermediate portion connecting the outer edge of the first radial portion and the inner edge of the second radial portion.

The flange comprises an axial portion that extends axially from the bore of the substantially radial portion and is housed in the mounting bore of the device.

The axial portion is mounted securely in the mounting bore of the device.

The axial portion is mounted tightly in the mounting bore of the device.

The axial portion comprises retaining means that cooperate with the central mounting bore of the device.

The flange comprises retaining means that are intended to cooperate with the screw.

The annular folded portion of the flange consists of a collar extending substantially axially from the outer edge of the flange.

The collar is cylindrical.

The collar is frustoconical.

The collar is directed towards the outside of the pulley device.

The collar is directed towards the inside of the pulley device.

The annular folded portion comprises an inner radial annular part that faces the substantially radial portion of the flange and is folded into contact with the portion, an outer radial annular part that axially faces the inner radial annular part, and an intermediate part that extends substantially axially and links the inner annular part and outer annular part so as to form a circumferential trough that is radially open towards the axially protruding annular portion of the rotating outer element.

The intermediate part of the folded portion is cylindrical.

The outer radial annular part of the folded portion is surrounded radially by the axially protruding annular portion of the rotating outer element.

The outer radial annular part of the folded portion axially covers at least a part of the axially protruding annular portion of the rotating outer element.

The pulley is made of metal, for example of steel.

The pulley is made of plastics material, for example of polyamide.

The pulley is formed by overmoulding plastics material on the outer ring of the bearing.

The flange is made of metal, for example of steel.

The flange is made of plastics material, for example of polyamide.

BRIEF DESCRIPTION OF THE DRAWINGS

The present invention will be understood better from reading the detailed description of a number of embodiments, which are given by way of entirely non-limiting example and are illustrated in the appended drawings, in which.

DETAILED DESCRIPTION

Figure 1:
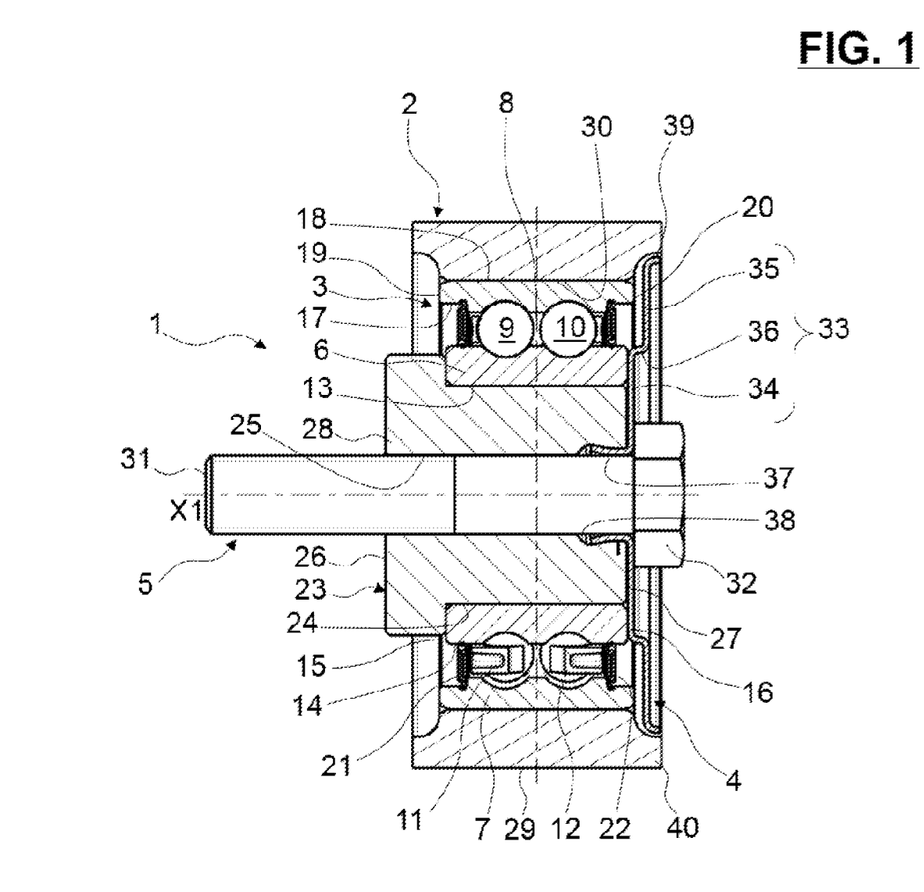
FIG. 1 is a view in axial section of a pulley device according to a first embodiment.

As can be seen in FIG. 1, a pulley device for a tensioner roller or winding roller of a belt, bearing the overall reference 1, has a geometric axis X1 and comprises a pulley 2 designed to cooperate with a transmission element (not shown) such as a belt or a chain, a bearing 3, a protective flange 4, and a screw 5.

The bearing 3 comprises a fixed inner ring 6, a rotating outer ring 7, the rings 6, 7 being coaxial about the axis X1 and forming a radial space 8 between one another. The bearing 3 also comprises two rows of rolling elements 9 and 10, in the form of balls here, that are disposed between the rings, and cages 11 and 12 that maintain the circumferential spacing of the rolling elements 9 and 10, respectively.

The inner ring 6 and outer ring 7 are concentric. In the exemplary embodiment illustrated, the rings are solid, that is to say obtained by machining or grinding with removal of material from metal tubes, bars, forged parts or rolled blanks.

The inner ring 6 comprises a bore 13, an outer cylindrical surface 14 provided with raceways that have, in axial section, a concave internal profile suitable for the rolling elements 9, 10, and two front surfaces 15, 16.

The outer ring 7 comprises a cylindrical bore 17 provided with raceways that have, in axial section, a concave internal profile suitable for the rolling elements 9, 10, an outer cylindrical surface 18 on which the pulley 2 is mounted, and two front surfaces 19, 20.

Alternatively, the bearing may comprise a different number of rows of rolling elements arranged between the outer and inner rings, for example a single row of rolling elements.

Alternatively, the bearing may comprise other types of rolling elements, for example tapered rollers or needles. Alternatively, the bearing may be a plain bearing.

The bearing 3 advantageously comprises, on each axial side of the radial space 8, an annular seal 21, 22 for closing the radial space between the rings 6, 7 and inside which the rolling elements 9, 10 are housed.

The seals 21, 22 advantageously each comprise a first end fixed in a circumferential groove provided in the bore 17 of the outer ring 7, and a second end formed by a lip in sliding contact with the outer cylindrical surface 14 of the inner ring 6. The radial space 8 is thus closed in a sealed manner axially between the two seals 21, 22.

In the embodiment illustrated in FIG. 1, the bearing 3 also comprises a spacer 23. The spacer 23 is annular and is provided with an outer surface 24 fitted in the bore 13 of the inner ring 6, with a bore 25, and with two front surfaces 26, 27.

In this embodiment, the bore 25 of the spacer is coaxial with the bore 13 of the inner ring 6. Alternatively, the axis of the bore 25 may be offset with respect to the axis of the bore 13, the spacer 23 then forming an eccentric.

The spacer 23 extends axially out of the bearing 3 in the axial direction towards a support on which the pulley device 1 is intended to be mounted. The spacer 23 advantageously comprises a radial rim 28 against which the front face 15 of the inner ring 6 of the bearing 3 comes to bear. On the axially opposite side from this bearing engagement with the inner ring 6, the radial rim 28 comprises a surface for bearing against the support of the device 1. Such a spacer 23 makes it possible to alter the spacing between the pulley device 1 and the support thereof depending on the application.

The fixed inner ring 6 and the spacer 23 of the bearing 3 form a fixed inner element for the pulley device 1. The bore 25 of the spacer 23 forms a mounting bore for the device.

Alternatively, the bearing 3 does not comprise a spacer. In this case, the inner ring 6 forms only a fixed inner element for the pulley device 1, and the bore 13 of the inner ring 6 forms the mounting bore for the device.

In this embodiment, the pulley device 1 comprises a pulley 2. The pulley 2 comprises an outer cylindrical surface 29, and an inner surface 30 secured to the outer ring 7. The pulley has a substantially tubular shape and is centered on the central axis X1.

The pulley 2 may advantageously be made of plastics material, and preferably of polyamide, for example of PA6 or PA66. The pulley 2 may advantageously be formed by overmoulding plastics material on the outer ring 7 of the bearing 3. This results in excellent cohesion between these parts. Alternatively, the pulley 2 may be made of metal material, for example of steel, and be mounted tightly on the outer cylindrical surface 18 of the outer ring 7. The pulley 2 may also have other shapes that are optimized depending on the needs of the application.

The rotating outer ring 7 of the bearing 3 and the pulley 2 form a rotating outer element for the pulley device 1. The outer surface 29 of the pulley 2 forms an outer surface of the rotating outer element that is able to cooperate with a transmission element, such as a belt or a chain.

The screw 5 comprises a body 31 and a head 32 at one end of the body 30. The body 30 is housed in the mounting bore of the bearing 3, in this case the bore 25 of the spacer 23.

The protective flange 4 comprises a substantially radial portion 33. In this embodiment, the substantially radial portion 33 comprises a first radial portion 34 of small diameter provided with an inner edge forming the bore of the flange 4 and an outer edge, a second radial portion 35 of large diameter provided with an inner edge and an outer edge, and an intermediate portion 36 extending substantially axially and connecting the outer edge of the first radial portion 33 and the inner edge of the second radial portion 34.

The intermediate portion 36 is cylindrical. Alternatively, the intermediate portion 36 may be frustoconical and directed towards the inside or the outside of the pulley device 1.

The first radial portion 34 comes to bear against the front surface 16 of the inner ring 6 and against the front surface 27 of the spacer 23 situated opposite the rim 28, and thus of the support on which the device 1 is intended to be mounted.

The head 32 of the screw 5 has a relatively flat surface that comes to bear against the first radial portion 34 of the flange 4, the first radial portion 34 being axially jammed between the head 32 of the screw 5 and the inner ring 6 of the bearing 3. According to a variant that is not illustrated, a washer may be interposed between the screw head and the substantially radial portion of the flange.

Advantageously, the flange 4 also comprises an axial portion 37 extending axially from the inner edge of the first radial portion 34. The axial portion 37 is housed and secured in the mounting bore 25 of the device 1. The axial portion 37 makes it possible to center the flange 4 with respect to the bearing 3, for the one part, and the pulley 2, for the other.

In the embodiment illustrated in FIG. 1, the bore 25 of the spacer 23 is provided with a circumferential groove 38, the axial portion 37 being radially deformed so as to be partially housed in the circumferential groove 38. The flange 4 is kept axially and radially together with the bearing 3 via its axial portion 37 that cooperates with the walls of the circumferential groove 38 provided in the spacer 23. Alternatively, the circumferential groove may be provided in the bore of the inner ring of the bearing if the latter does not have a spacer.

In an alternative that is not shown, the axial portion of the flange may be mounted tightly in the bore of the bearing. In other variants, the axial portion is mounted securely in the mounting bore of the bearing by any other suitable means, for example by adhesive bonding.

According to the invention, the flange 4 comprises an annular folded portion 39 extending substantially axially from the outer edge of the second radial portion 35 of large diameter.

In the first embodiment illustrated in FIG. 1, the annular folded portion 39 is a cylindrical annular collar extending axially from the outer edge of the flange 4 towards the outside of the pulley device 1.

The collar 39 passes radially into the immediate vicinity of an axially protruding annular portion 40 of the pulley 2 so as to form a narrow passage.

In the present embodiment, the axial extension of the bearing 3 is defined between two radial planes along the front surfaces 19, 20 of the outer ring 7, the front surfaces 15, 16 of the inner ring 6 being set back axially with respect to the front surfaces 19, 20, respectively. The annular portion 40 extends axially beyond the radial plane along the front surface 20 of the bearing 3.

The collar 39 is radially surrounded by the axially protruding annular portion 40 of the pulley 2. The collar 39 and a surface on the inside of the portion 40 both extend axially and radially face one another, an annular space being defined therebetween. The collar 39 and the protruding portion 40 of the pulley 2 thus define a narrow passage which extends axially along a certain length. In this way, sealing between the flange 4 and the pulley 2 is improved.

Particularly advantageously, the collar 39 and a surface on the inside of the portion 40 have matching shapes.

Figure 2:
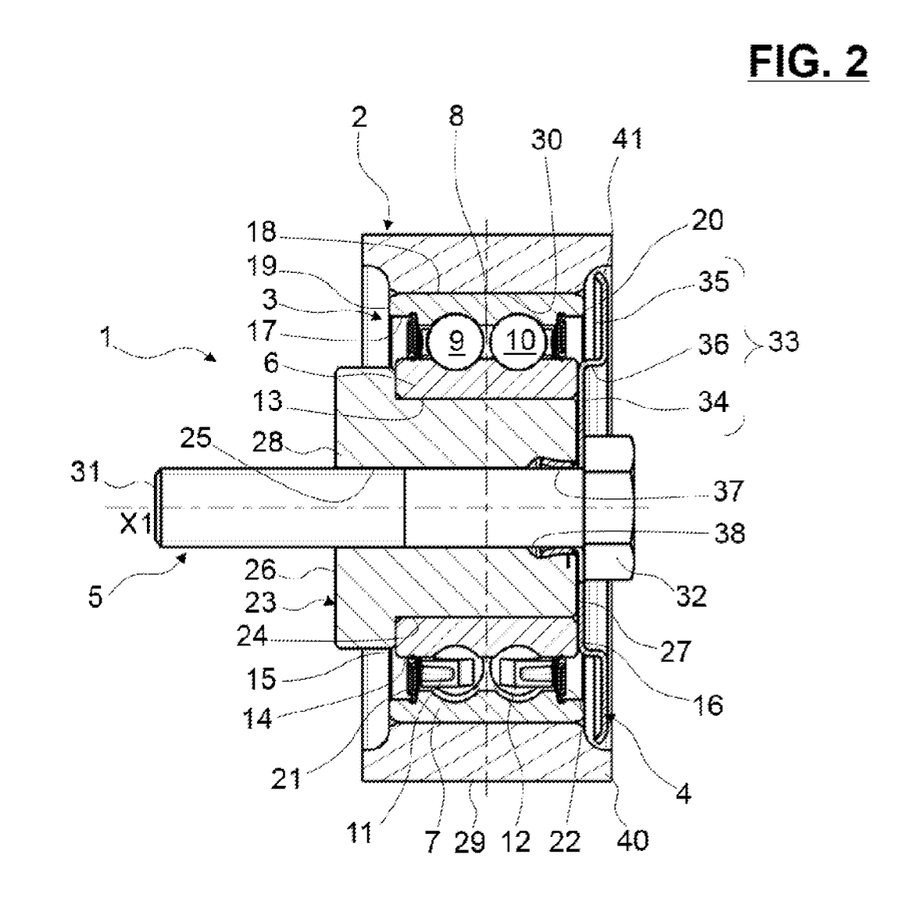
FIG. 2 is a view in axial section of a pulley device according to a second embodiment.

A second embodiment of the invention is illustrated in FIG. 2, in which the same elements have the same reference numerals and differs from the previous embodiment in that the flange 4 is provided with an annular folded portion 41 at its outer edge, which consists of a frustoconical collar.

The annular folded portion 41 is a frustoconical annular collar extending axially from the outer edge of the flange 4 towards the inside of the pulley device 1.

The collar 41 passes radially into the immediate vicinity of the axially protruding annular portion 40 of the pulley 2 so as to form a narrow passage.

Figure 3:
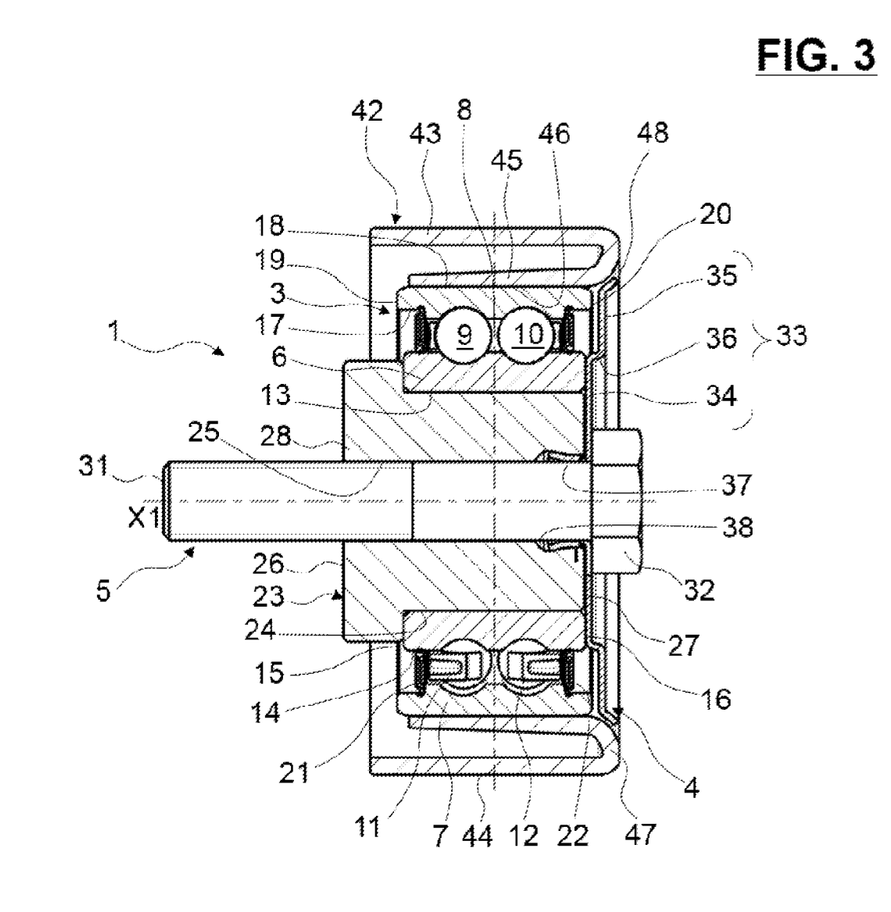
FIG. 3 is a view in axial section of a pulley device according to a third embodiment.

A third embodiment of the invention is illustrated in FIG. 3, in which the same elements have the same reference numerals and differs from the previous embodiment in that the pulley device 1 comprises a C-shaped pulley 42.

The pulley 42 comprises an outer annular portion 43 with an outer cylindrical surface 44 that is able to cooperate with a transmission means, and an inner cylindrical portion. The pulley 42 also comprises an inner annular portion 45 with a cylindrical bore 46 mounted tightly on the outer cylindrical surface 18 of the rotating outer ring 7 of the bearing 3, and an outer cylindrical surface. The outer annular portion 43 is tubular and has a larger diameter than the inner annular portion 45, which is likewise tubular, the outer annular portion 43 radially surrounding the inner annular portion 45. The outer annular portion 43 likewise has an axial dimension greater than the inner annular portion 45, the outer annular portion 43 protruding axially with respect to the inner annular portion 45 on both axial sides.

Finally, the pulley 42 comprises an intermediate portion 47 connecting the inner annular portion 43 and outer annular portion 45. The intermediate portion is provided on one axial side of the device 1, and advantageously on the outer side in the direction of the head 32 of the screw 5. The intermediate portion 47 has a frustoconical shape directed towards the inside of the device 1 on account of the difference in axial length between the inner annular portion 43 and outer annular portion 45. The intermediate portion 47 protrudes axially with respect to the bearing 3.

The pulley 42 has the overall shape of a C in axial section, defining an annular opening that is open on one axial side of the device in the direction of the support on which the device 1 is intended to be mounted. The pulley 42 is advantageously in one piece. The pulley 42 is advantageously formed by cutting out and stamping a metal sheet, for example made of steel.

In the third embodiment illustrated in FIG. 3, the annular folded portion of the flange 4 is a frustoconical annular collar 48 extending from the outer edge of the flange 4 towards the outside of the pulley device 1.

The collar 48 is radially surrounded by the axially protruding intermediate portion 47 of the pulley 2. The collar 48 and a surface on the inside of the portion 47 both extend substantially axially and radially face one another, an annular space being defined therebetween. The collar 48 and the protruding portion 47 of the pulley 2 thus define a narrow passage which extends axially along a certain length. Particularly advantageously, the collar 48 and a surface on the inside of the portion 47 have matching shapes.

Figure 4:
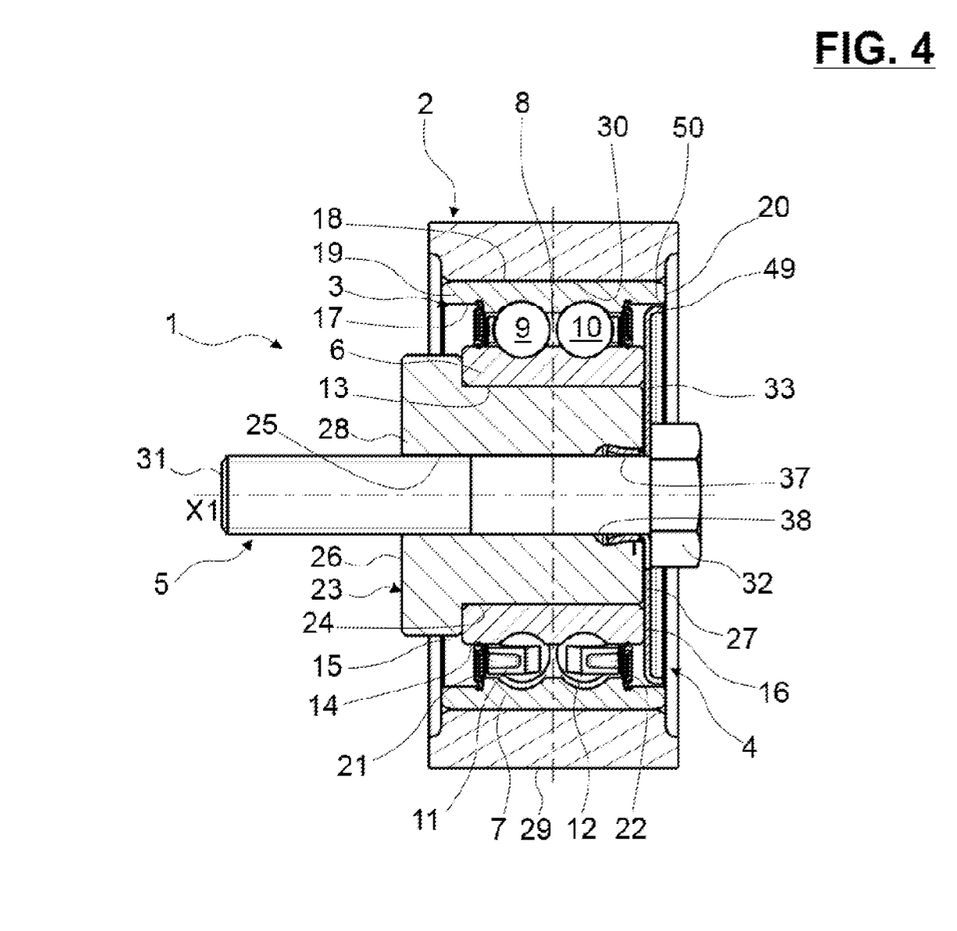
FIG. 4 is a view in axial section of a pulley device according to a fourth embodiment.

A fourth embodiment is illustrated in FIG. 4, in which the same elements have the same reference numerals and differs from the previous embodiments in that the flange 4 comprises a collar 49 that passes radially into the immediate vicinity of an axially protruding annular portion 50 of the rotating outer ring 7 so as to form a narrow passage.

The flange 4 of the pulley device 1 in this fourth embodiment of the invention comprises a single radial portion 33. Unlike the previous embodiments, the flange 4 does not require an intermediate portion to reinforce its rigidity on account of its smaller radial dimension. The radial portion 33 comes to bear against the front surfaces 16 and 27 of the fixed inner ring 6 and of the spacer 23, respectively, of the bearing 3.

The annular folded portion of the flange is a cylindrical annular collar 49 extending axially from the outer edge of the radial portion 33 of the flange 4 towards the outside of the pulley device 1.

The collar 49 passes radially into the immediate vicinity of an axially protruding annular portion 50 of the rotating outer ring 7 of the bearing 3 so as to form a narrow passage. The front surface 16 of the inner ring 6 is axially set back with respect to the front surface 20 provided on the protruding portion 50 of the outer ring 7.

The collar 49 is radially surrounded by the axially protruding annular portion 50 of the outer ring 7. The collar 49 and a surface on the inside of the portion 50 both extend axially and radially face one another, an annular space being defined therebetween. The collar 49 and the protruding portion 50 thus define a narrow passage which extends axially along a certain length.

Figure 5:
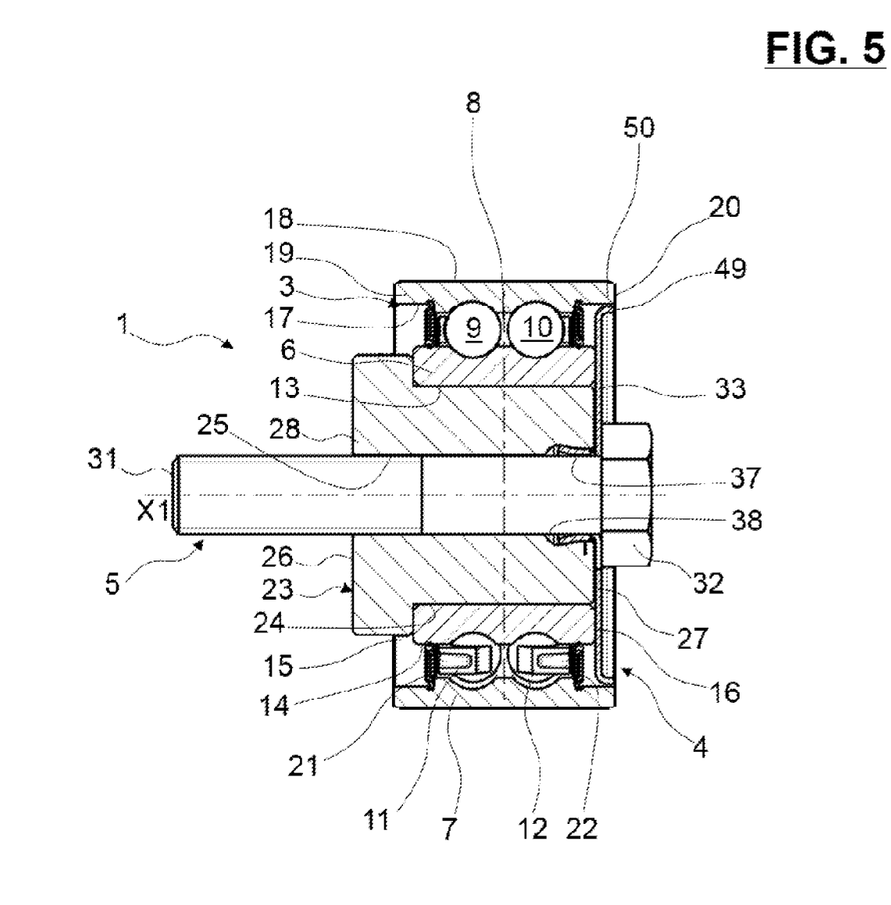
FIG. 5 is a view in axial section of a pulley device according to a fifth embodiment.

FIG. 5 illustrates a fifth embodiment, which differs from the previous embodiment in that the outer cylindrical surface 18 of the rotating outer ring 7 of the bearing 3 is able to cooperate directly with a transmission element such as a belt or a chain.

Specifically, and in contrast to the previous embodiment, the pulley device 1 does not comprise a pulley separate from the bearing 3. The function of rotational support and path guide with the transmission element is ensured by just the outer ring 7. The rotating outer ring 7 of the bearing 3 forms only the rotating outer element of the pulley device.

Similarly to the previous embodiment, the flange 4 is provided with a cylindrical annular collar 49 forming a radial narrow passage with an axially protruding annular portion 50 of the outer ring 7.

Figure 6:
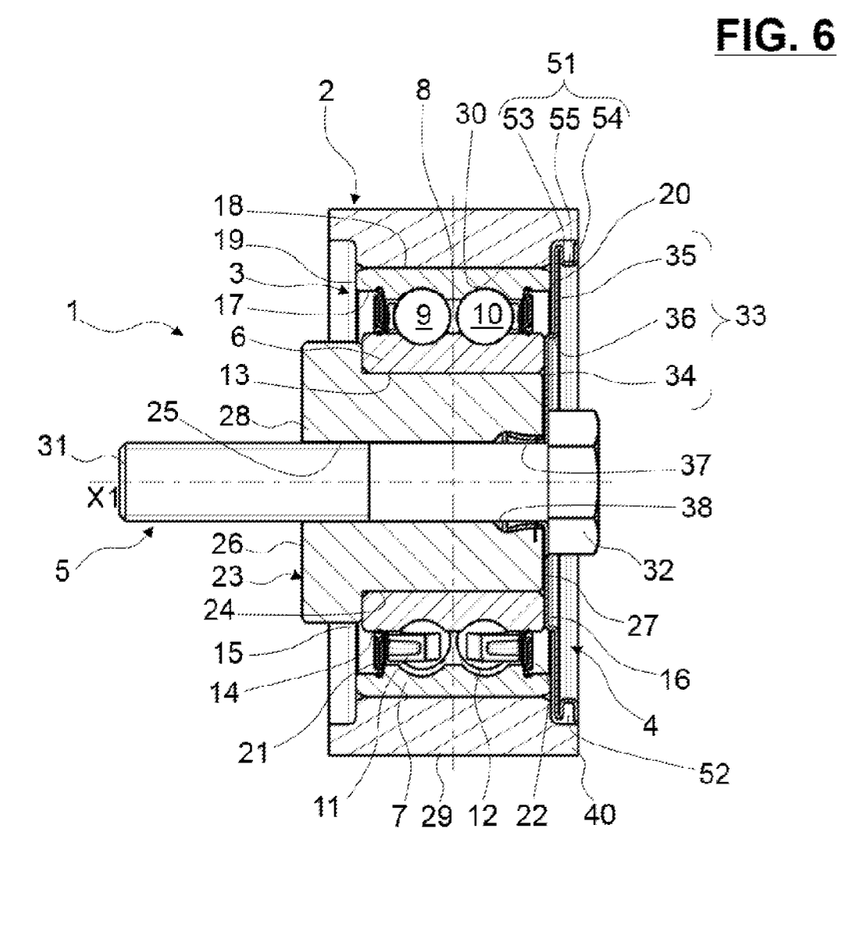
FIG. 6 is a view in axial section of a pulley device according to a sixth embodiment.

A sixth embodiment is illustrated in FIG. 6, in which the same elements have the same reference numerals and differs from the first embodiment in FIG. 1 in that the flange 4 comprises an annular folded portion 51 forming a circumferential trough 52.

The annular folded portion 51 is provided at the outer edge of the second radial portion 35 of large diameter of the flange 4. The annular folded portion 51 comprises an inner radial annular part 53 that faces the second radial portion 35 and is folded into contact with the portion 35. The inner radial annular part 53 is directed radially towards the inside of the device 1.

The annular folded portion 51 also comprises an outer radial annular part 54 that faces the inner radial annular part 53.

Finally, the annular folded portion 51 comprises an intermediate part 55 that extends substantially axially and links the inner annular part 53 and outer annular part 54 so as to form a circumferential trough 52 that is radially open towards the axially protruding annular portion 40 of the pulley 2.

In the embodiment illustrated, the intermediate part 55 is cylindrical. Alternatively, the intermediate part 55 may be frustoconical, rounded or any other shape that is able to extend substantially in the axial direction in order to connect the inner radial portion 53 and outer radial portion 54.

The annular folded portion 51 is radially surrounded as a whole by the axially protruding portion 40 of the pulley 2. In particular, the outer edge of the outer radial annular part 54 is surrounded by the axially protruding portion 40, the circumferential trough 52 thus being entirely surrounded by the axially protruding portion 40.

Outside pollution passing through the outer radial annular part 54 of the flange 4 can be blocked by the inner radial annular part 53 and be collected in the trough 52 at a certain distance from the edge of the bearing 3, and more particularly at a certain distance from the seal 22.

Figure 7:
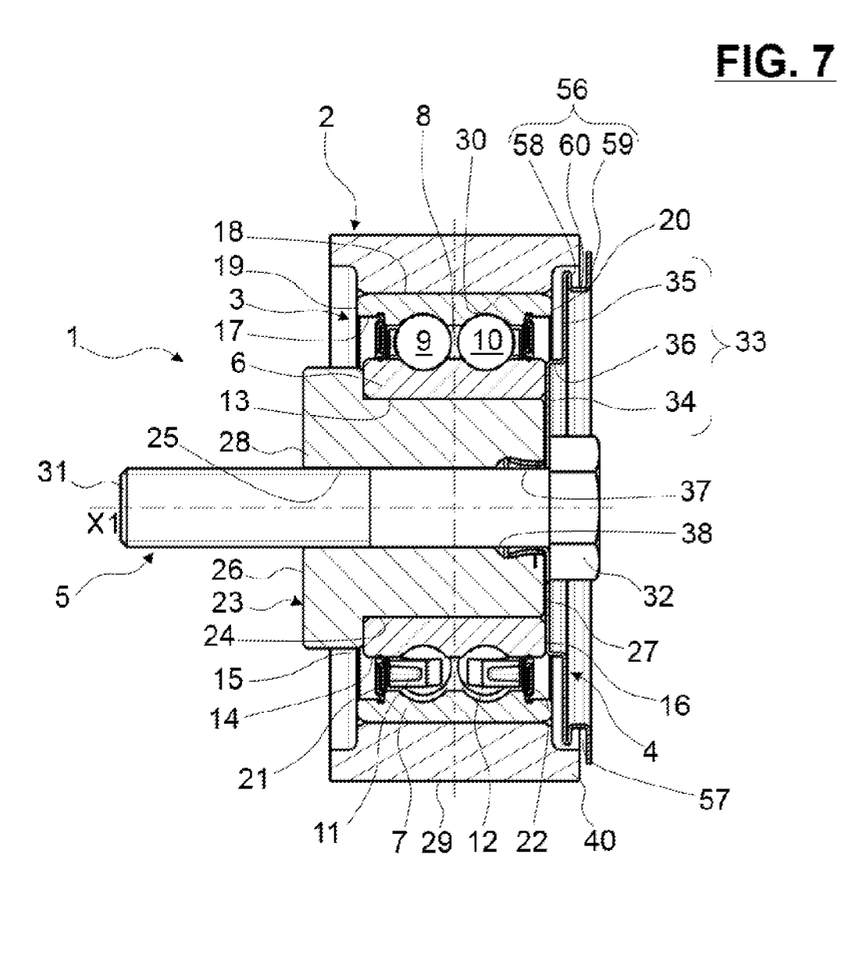
FIG. 7 is a view in axial section of a pulley device according to a seventh embodiment.

A seventh embodiment is illustrated in FIG. 7, in which the same elements have the same reference numerals and differs from the previous embodiment in FIG. 6 in that the flange 4 comprises a folded portion 56 partially axially covering the pulley 2.

The annular folded portion 56 is provided at the outer edge of the second radial portion 35 of large diameter of the flange 4. The annular folded portion 56 comprises an inner radial annular part 58 that faces the second radial portion 35 and is folded into contact with the portion 35. The inner radial annular part 58 is directed radially towards the inside of the device 1.

The annular folded portion 56 also comprises an outer radial annular part 59 that faces the inner radial annular part 58.

Finally, the annular folded portion 56 comprises a cylindrical intermediate part 60 that extends substantially axially and links the inner annular part 58 and outer annular part 59 so as to form a circumferential trough 57 that is radially open towards the axially protruding annular portion 40 of the pulley 2.

The outer edge of the second radial portion 35 of large diameter, with the inner radial annular part 58, is radially surrounded by the axially protruding portion 40 of the pulley 2. The outer edge of the second radial portion 35 of large diameter thus passes radially into the immediate vicinity of the axially protruding portion 40 of the pulley 2 so as to form a first narrow passage.

According to this embodiment, the intermediate part 60 protrudes axially with respect to the front surface of the protruding axial portion 40 of the pulley 2. The outer radial annular part 59 extends radially from the protruding end of the intermediate part 60 in the outward direction of the device 1. The outer radial annular part 59 partially covers the front surface of the axially protruding portion 40 of the pulley 2 so as to form a second narrow passage.

Outside pollution passing through the outer radial annular part 59 of the flange 4 can be blocked by the front surface of the axially protruding portion 40 of the pulley 2 and be collected in the trough 57 at a certain distance from the edge of the bearing 3, and more particularly at a certain distance from the seal 22. Moreover, the annular folded portion 56 forms an outer narrow passage and an inner narrow passage on each side of the circumferential trough so as to form a succession of barriers for the pollution.

Figure 8:
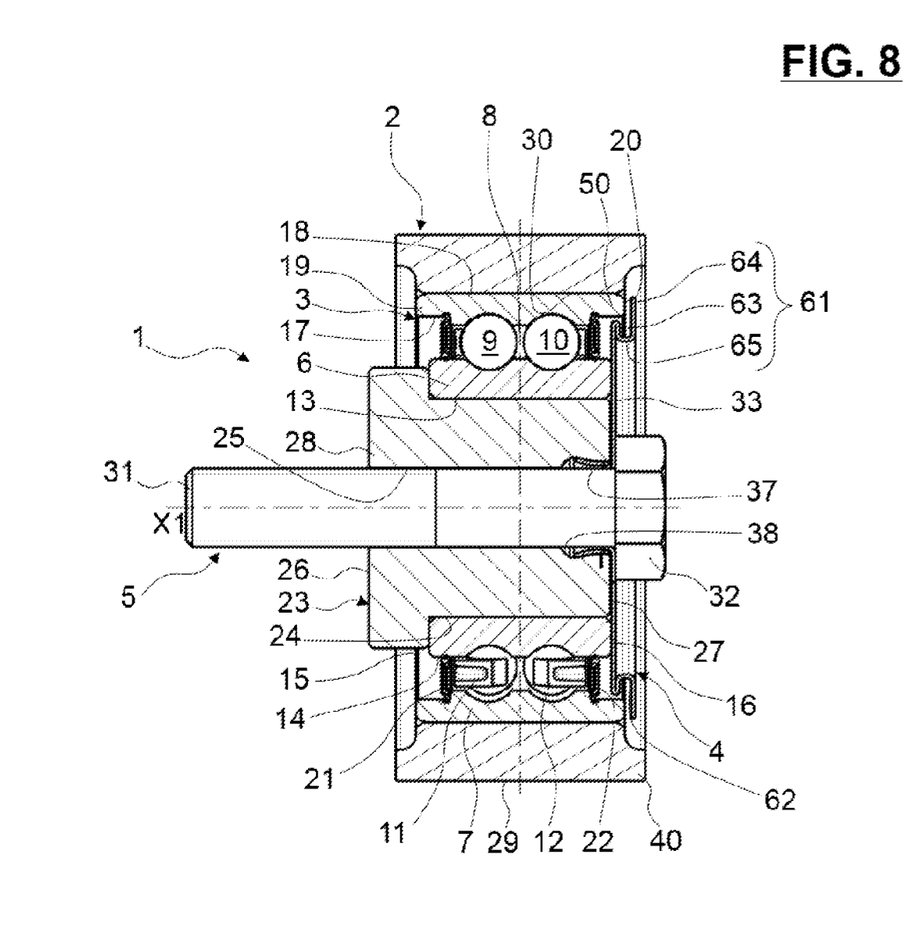
FIG. 8 is a view in axial section of a pulley device according to an eighth embodiment.

An eighth embodiment is illustrated in FIG. 8, in which the same elements have the same reference numerals and differs from the previous embodiment in FIG. 7 in that the flange 4 comprises an annular folded portion 61 that passes radially into the immediate vicinity of an axially protruding annular portion 50 of the rotating outer ring 7.

The flange 4 of the pulley device 1 in this eighth embodiment of the invention comprises a single radial portion 33.

The annular folded portion 61 is provided at the outer edge of the radial portion 33 of the flange 4. The annular folded portion 61 comprises an inner radial annular part 63 that faces the radial portion 33 and is folded into contact with the portion 33. The inner radial annular part 63 is directed radially towards the inside of the device 1.

The annular folded portion 61 also comprises an outer radial annular part 64 that faces the inner radial annular part 63.

Finally, the annular folded portion 61 comprises a cylindrical intermediate part 65 that extends substantially axially and links the inner annular part 63 and outer annular part 64 so as to form a circumferential trough 62 that is radially open towards the axially protruding annular portion 50 of the outer ring 7 of the bearing 3.

The outer edge of the radial portion 33, with the inner radial annular part 63, is radially surrounded by the axially protruding portion 50 of the outer ring 7. The outer edge of the radial portion 33 thus passes radially into the immediate vicinity of the axially protruding portion 50 of the outer ring 7 so as to form a first narrow passage.

According to this embodiment, the intermediate part 65 protrudes axially with respect to the front surface 20 of the protruding axial portion 50 of the outer ring 7. The outer radial annular part 64 extends radially from the protruding end of the intermediate part 65 in the outward direction of the device 1. The outer radial annular part 64 partially covers the front surface 20 of the axially protruding portion 50 of the outer ring 7 so as to form a second narrow passage.

The outer edge of the outer radial annular part 64 is radially surrounded by the axially protruding portion 40 of the pulley 2. According to an advantageous embodiment that is not shown, the outer edge of the outer radial annular part may pass radially into the immediate vicinity of the axially protruding portion 40 of the pulley 2 so as to form a third narrow passage.

According to an alternative, not shown, to this eighth embodiment, the outer cylindrical surface 18 of the rotating outer ring 7 of the bearing 3 may be able to cooperate directly with a transmission element such as a belt or a chain, the pulley device 1 not comprising a pulley separate from the bearing 3. The rotating outer ring 7 of the bearing 3 may thus form only the rotating outer element of the pulley device.

Moreover, all or only some of the technical features of the various embodiments can be combined with one another. Thus, the pulley device can be adapted in terms of cost, performance and ease of use.

What is claimed is:

1. A Pulley device for a tensioner roller or winding roller of a transmission element, comprising:
    a fixed inner element having a mounting bore for the device that is intended to take a screw,
    a rotating outer element that is mounted to rotate coaxially about the fixed inner element and has an outer surface intended to cooperate with the transmission element, and
    an annular protective flange having a substantially radial portion bearing against a front surface of the fixed inner element, the substantially radial portion having an inner edge forming a bore of the flange, when the annular protective flange is viewed in cross-section a portion of the flange extends from the inner edge into the pulley device so as to be axially overlapped by the fixed inner element, the portion having a curved portion and an distal end, the curved portion and the distal end forming a first abutment and a second abutment, respectively, which are configured to abut a fastener when a fastener is located within the bore
    the flange provides an annular folded portion extending substantially axially from an outer edge of the flange and passing radially into the immediate vicinity of an axially protruding annular portion of the rotating outer element to form a narrow passage.

2. The pulley device according to claim 1, wherein the pulley device comprises a bearing having a rotating outer ring that is part of the fixed inner element, a fixed inner ring that is part of the rotating outer element, the rings being coaxial and forming a radial space between one another, sealing means that close the radial space on each axial side, and at least one row of rolling elements arranged in the radial space.

3. The pulley device according to claim 2, wherein the inner ring of the bearing comprises a bore forming the mounting bore of the device that is intended to take a screw, the fixed inner element consisting of the fixed inner ring of the bearing.

4. The pulley device according to claim 2, wherein the bearing comprises an annular spacer mounted in a bore of the inner ring of the bearing, the spacer being provided with a bore forming the mounting bore of the device that is intended to take a screw, the fixed inner element consisting of the fixed inner ring and the spacer of the bearing.

5. The pulley device according to claim 1, wherein the pulley device comprises a pulley mounted on the rotating outer ring of the bearing, the pulley being provided with an outer surface configured to cooperate directly with a transmission element, the rotating outer element consisting of the pulley and the outer ring of the bearing.

6. The pulley device according to claim 1, wherein the rotating outer ring of the bearing comprises an outer surface intended to cooperate directly with a transmission element, the rotating outer element consisting of the outer ring of the bearing.

7. The pulley device according to claim 1, wherein the annular folded portion of the flange consists of a collar extending substantially axially from the outer edge of the flange.

8. The pulley device according to claim 1, wherein the annular folded portion comprises:

an inner radial annular part that faces the substantially radial portion of the flange and is folded into contact with the portion, an outer radial annular part that axially faces the inner radial annular part, and an intermediate part that extends substantially axially and links the inner annular part and outer annular part to form a circumferential trough that is radially open towards the axially protruding annular portion of the rotating outer element.

9. The pulley device according to claim 8, wherein the outer radial annular part of the folded portion is surrounded radially by the axially protruding annular portion of the rotating outer element.

10. The pulley device according to claim 8, wherein the outer radial annular part of the folded portion axially covers at least a part of the axially protruding annular portion of the rotating outer element.

11. The pulley device according to claim 1, wherein when the annular protective flange is viewed in cross section, the portion thereof which forms the curved portion and the distal end combine to form an S-shape.

12. The pulley device according to claim 1, wherein when the annular protective flange is viewed in cross section, the curved portion is concave and opens in a radially outwardly direction from a geometric axis of the pulley device.

13. A pulley device for a tensioner roller or winding roller of a transmission element, comprising:

an inner element;

a spacer element having a mounting bore configured to receive a screw therein, the inner element being located on a radial outer surface of the spacer element, the spacer element having a radially innermost surface defining a circumferential groove therein;

an outer element, the inner element and outer element being configured to rotate relative to each other, the outer element having outer surface intended to cooperate with the transmission element; and an annular protective flange having a substantially radial portion bearing against a front surface of the spacer, the substantially radial portion having an inner edge forming a bore of the flange, when the annular protective flange is viewed in cross-section a portion of the flange extends from the inner edge into the pulley device so as to be axially overlapped by the fixed inner element, the portion having a curved portion and an distal end, the curved portion and the distal end forming a first abutment and a second abutment, respectively, which are configured to abut a fastener when a fastener is located within the bore, the portion of the annular protective flange being configured to be located in the circumferential groove in the spacer;

the flange provides an annular folded portion extending substantially axially from an outer edge of the flange and passing radially into the immediate vicinity of an axially protruding annular portion of the rotating outer element to form a narrow passage.

14. A Pulley device for a tensioner roller or winding roller of a transmission element, comprising:

a fixed inner element having a mounting bore for the device that is intended to take a screw, a rotating outer element that is mounted to rotate coaxially about the fixed inner element and has an outer surface intended to cooperate with the transmission element;

an annular protective flange having a substantially radial portion bearing against a front surface of the fixed inner element, the substantially radial portion having an inner edge forming a bore of the flange, when the annular protective flange is viewed in cross-section a radially outermost portion thereof extends in a direction away from the rotating outer element;

wherein, when the annular protective flange is viewed in cross-section, the defines an annular folded portion extending substantially axially and located between a first radially extending axial surface and a second radially extending axial surface of the annular protective flange.

15. The pulley device according to claim 14, wherein further comprising an annular spacer mounted in the mounting bore of the inner ring of the bearing, the spacer being provided with a bore forming the mounting bore of the device and is adapted to receive a fastener therein, the fixed inner element consisting of the fixed inner ring and the spacer of the bearing.

16. The pulley device according to claim 14, further comprising a pulley mounted on the rotating outer ring of the bearing, the pulley being provided with an outer surface configured to cooperate directly with a transmission element.

* * * * *